United States Patent [19]
Shen et al.

[11] Patent Number: 5,138,447
[45] Date of Patent: Aug. 11, 1992

[54] METHOD AND APPARATUS FOR COMMUNICATING COMPRESSED DIGITAL VIDEO SIGNALS USING MULTIPLE PROCESSORS

[75] Inventors: Paul Shen; Edward A. Krause, both of San Diego; Woo H. Paik, Encinitas, all of Calif.

[73] Assignee: General Instrument Corporation, Hatboro, Pa.

[21] Appl. No.: 653,779

[22] Filed: Feb. 11, 1991

[51] Int. Cl.⁵ ............................................. H04N 7/12
[52] U.S. Cl. ................................. 358/133; 358/135; 358/136; 358/105
[58] Field of Search ............... 358/133, 135, 136, 105, 358/141, 12

[56] References Cited

U.S. PATENT DOCUMENTS

| | | | |
|---|---|---|---|
| 4,546,386 | 10/1985 | Matsumoto et al. | 358/136 |
| 4,651,206 | 3/1987 | Ohki | 358/136 |
| 4,707,738 | 11/1987 | Ferre et al. | 358/135 |
| 4,731,664 | 3/1988 | Nishiwaki et al. | 358/136 |
| 4,816,906 | 3/1989 | Kummerfeldt et al. | 358/136 |
| 4,831,439 | 5/1989 | Fedele et al. | 358/136 |
| 4,837,618 | 6/1989 | Hatori et al. | 358/135 |
| 4,862,264 | 8/1989 | Wells et al. | 358/136 |
| 4,887,156 | 12/1989 | Ohki | 358/133 |
| 4,888,640 | 12/1989 | Acampora et al. | 358/136 |
| 4,897,720 | 1/1990 | Wu et al. | 356/136 |
| 4,933,759 | 6/1990 | Van der Meer et al. | 358/105 |
| 4,942,465 | 7/1990 | Ohta | 358/133 |
| 4,984,076 | 1/1991 | Watanabe et al. | 358/133 |
| 5,068,724 | 11/1991 | Krause et al. | 358/136 |

OTHER PUBLICATIONS

"Fixed and Adaptive Predictors for Hybrid Predictive/Transform Coding", Ericsson, *IEEE Transactions on Communications*, vol. COM-33, No. 12, Dec. 1985.

"Scene Adaptive Coder", Chen and Pratt, *IEEE Transactions on Communications*, vol. COM-32, No. 3, Mar. 1984.

*Primary Examiner*—James J. Groody
*Assistant Examiner*—Glenton B. Burgess
*Attorney, Agent, or Firm*—Barry R. Lipsitz

[57] ABSTRACT

Digital video signals are processed by a plurality of independently operating processors to provide data for transmission in a compressed, motion compensated form. A video image frame area is divided into a set of subframes. The set of subframes is systematically shifted such that the individual subframes progressively cycle across and wrap around the video image frame area. For each successive video frame, video image data bounded by each of the different subframes is independently compressed using motion estimation to reduce data redundancy among the successive frames. The motion estimation is limited for each subframe of a current video frame to areas of a previous video frame that were bounded by the same subframe in the previous frame. In an illustrated embodiment, the set of subframes is shifted once for each successive video frame, and each subframe includes a refresh region whereby the video image frame area is progressively refreshed as the subframes are shifted thereacross. Receiver apparatus for use in decoding the independently processed subframe data is also disclosed.

27 Claims, 5 Drawing Sheets

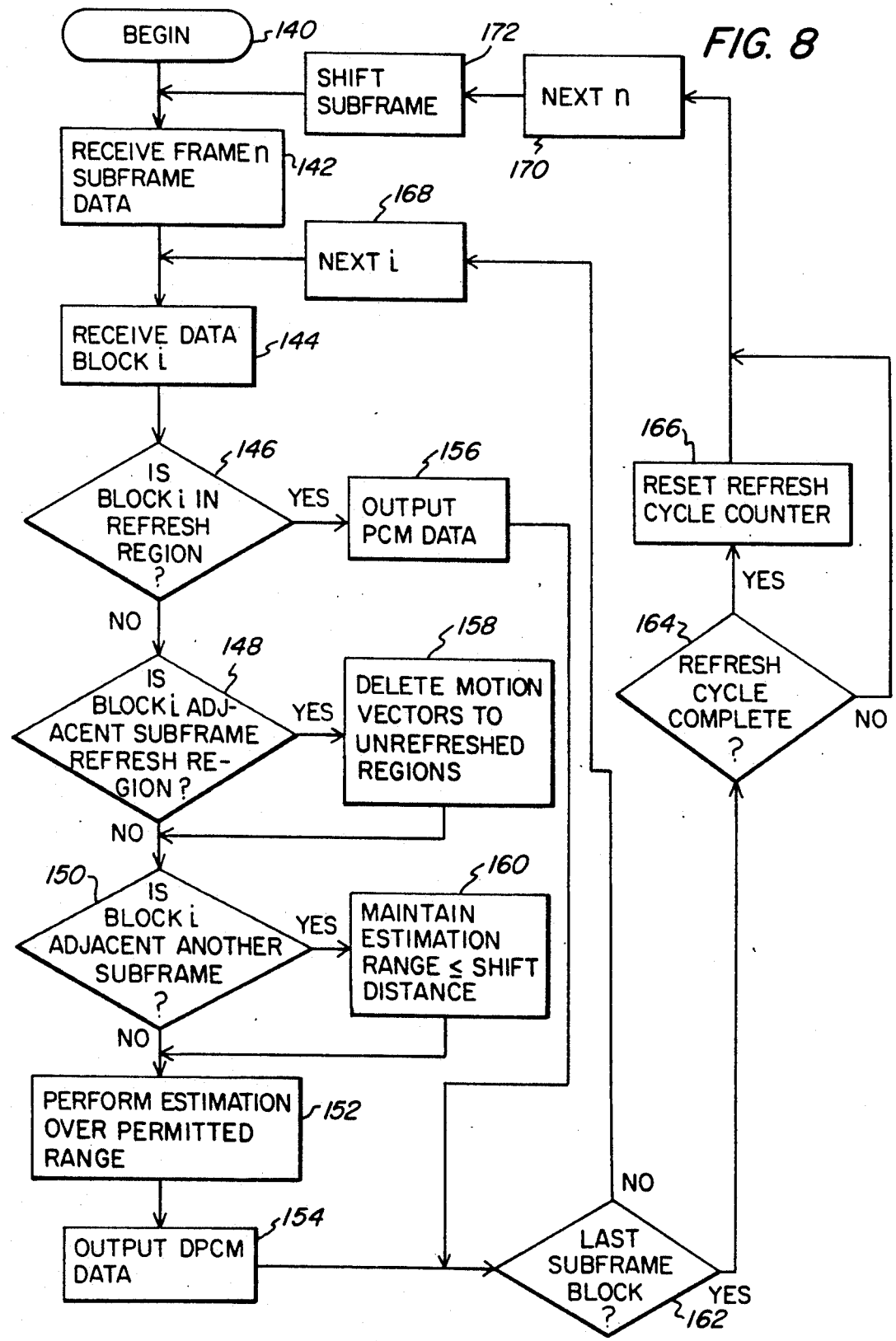

METHOD AND APPARATUS FOR COMMUNICATING COMPRESSED DIGITAL VIDEO SIGNALS USING MULTIPLE PROCESSORS

BACKGROUND OF THE INVENTION

The present invention relates to the compression of digital data, and more particularly to a method and apparatus for communicating compressed, motion compensated digitized video signals.

Television signals are conventionally transmitted in analog form according to various standards adopted by particular countries. For example, the U.S. has adopted the standards of the National Television System Committee ("NTSC"). Most European countries have adopted either PAL (Phase Alternating Line) or SECAM standards.

Digital transmission of television signals can deliver video and audio services of much higher quality than analog techniques. Digital transmission schemes are particularly advantageous for signals that are broadcast by satellite to cable television affiliates and/or directly to home satellite television receivers. It is expected that digital television transmitter and receiver systems will replace existing analog systems just as digital compact discs have largely replaced analog phonograph records in the audio industry.

A substantial amount of digital data must be transmitted in any digital television system. This is particularly true where high definition television ("HDTV") is provided In a digital television system, a subscriber receives the digital data stream via a receiver/descrambler that provides video, audio, and data to the subscriber. In order to most efficiently use the available radio frequency spectrum, it is advantageous to compress the digital television signals to minimize the amount of data that must be transmitted.

The video portion of a television signal comprises a sequence of video images (typically "frames") that together provide a moving picture. In digital television systems, each line of a video frame is defined by a sequence of digital data samples referred to as "pixels". A large amount of data is required to define each video frame of a television signal. For example, 7.4 megabits of data is required to provide one video frame at NTSC resolution. This assumes a 640 pixel by 480 line display is used with 8 bits of intensity value for each of the primary colors red, green, and blue. High definition television requires substantially more data to provide each video frame. In order to manage this amount of data, particularly for HDTV applications, the data must be compressed.

Video compression techniques enable the efficient transmission of digital video signals over conventional communication channels. Such techniques use compression algorithms that take advantage of the correlation among adjacent pixels in order to derive a more efficient representation of the important information in a video signal. The most powerful compression systems not only take advantage of spatial correlation, but can also utilize similarities among adjacent frames to further compact the data.

Motion compensation is one of the most effective tools for accounting for and reducing the amount of temporal redundancy in sequential video frames. One of the most effective ways to apply motion compensation in video compression applications is by differential encoding. In this case, the differences between two consecutive images (e.g., "frames") are attributed to simple movements. A signal encoder includes a motion estimator that estimates or quantifies these movements by observing the two frames, and provides motion vector data for transmission along with the compressed video data to a receiver. The transmitted video data comprises the differences between a current frame and prior prediction frame. The receiver includes a corresponding decoder that uses the received information to transform the previous frame, which is known, in such a way that it can be used to effectively predict the appearance of the current frame, which is unknown.

In this way, the amount of information needed to represent the image sequence can be significantly reduced, particularly when the motion estimation model closely resembles the frame to frame changes that actually occur. This technique can result in a significant reduction in the amount of data that needs to be transmitted once simple coding algorithms are applied to the prediction error signal. An example of such a motion compensated video compression system is described by Ericsson in "Fixed and Adaptive Predictors for Hybrid Predictive/Transform Coding", *IEEE Transactions on Communications*, Vol. COM-33, No. 12, Dec. 1985.

A problem with differential encoding is that it is impossible to ensure that the prediction signals derived independently at the encoder and decoder sites are identical at all times. Differences can arise as a result of transmission errors or whenever one of the two units is initialized. Thus, for example, a television channel change will render the prior frame data meaningless with respect to a first frame of a new program signal To deal with this problem, it is necessary to provide some means of periodic refreshing.

One method of refreshing the image is to periodically switch from differential encoding ("DPCM") to nondifferential encoding ("PCM"). For example, in a thirty frame per second system, the screen could be completely refreshed at one second intervals by inserting a PCM frame after every twenty-nine DPCM frames In this way, channel acquisition and the correction of transmission errors could be guaranteed after a delay of no more than one second. It is assumed here that the switch to PCM coding can be done without affecting the perceived quality of the reconstructed video. However, this is only possible in a variable bit rate encoding system using rate buffers to control fluctuations in the input and output data rates. Such a system is described by Chen and Pratt, in "Scene Adaptive Coder", *IEEE Transactions on Communications*, Vol. COM-32, No. 3, March 1984. Unfortunately, the resulting large number of bits due to the less efficient PCM encoding is difficult for the encoder and decoder buffers to handle, and measures used to control it may cause visible artifacts to appear in the reconstructed image.

To overcome this problem, segments or blocks of the image can be refreshed on a distributed basis. By assigning a different counter to each segment and systematically or randomly setting the initial count for each one, it is possible to attain the same refresh interval while maintaining a constant distribution of bits. It is even possible to eliminate the counters and instead, randomly refresh each segment based on a suitable probability distribution.

However, the motion compensation process itself introduces a new problem. The motion estimator does not limit the block displacements in such a way as to prevent overlap between refreshed and nonrefreshed regions of the image. For example, if one region of the image is refreshed during the transmission of a given frame, then there will exist an adjacent region in the same frame that has not yet been refreshed but is due to be refreshed during the next frame interval. Obviously, this unrefreshed region is much more likely to contain at least one error. If this less reliable data in the unrefreshed region is used to predict the appearance of certain segments of the next frame, then those segments of that frame will also be subject to errors. It is therefore possible that a recently refreshed region will cease to be accurate after only one frame. In a motion compensated system, this result tends to occur whenever there is movement from an unrefreshed region to a refreshed region, causing a recently refreshed segment of the image to immediately diverge from the corresponding encoder segment, even though no transmission errors occur after refreshing. Once again, the acquisition time and the duration of artifacts due to transmission errors can become unbounded.

A method for refreshing motion compensated sequential video frames that does not suffer from the above-mentioned problems is disclosed in commonly assigned, co-pending U.S. patent application Ser. No. 07/614,939, filed Nov. 16, 1990, and entitled "Method and Apparatus for Refreshing Motion Compensated Sequential Video Images", incorporated herein by reference. In the refresh technique disclosed therein, video images are divided into a plurality of adjacent regions. The image area is refreshed during a refresh cycle by communicating a different region in each successive video frame without motion compensation. An image area defined by the aggregate of the regions is progressively refreshed by the nonmotion compensated processing during the refresh cycle. The motion compensation process is controlled to prevent data contained in regions not yet refreshed during a current refresh cycle from corrupting data contained in regions that have been refreshed during the current refresh cycle.

In order to implement a cost-efficient HDTV system, it would be advantageous to process the video data using multiple encoders operating in parallel. Such a scheme would enable the use of low speed encoders and decoders to process video sequences which contain a large number of pixels, such as HDTV signals. The present invention provides a method and apparatus for implementing a high definition television system that provides both motion compensation and refreshing using multiple low speed processors. Complete independence among the processors is maintained without significantly compromising system performance.

SUMMARY OF THE INVENTION

In accordance with the present invention, a method and apparatus are provided for encoding digital video signals for transmission in a compressed, motion compensated form. A video image frame area is divided into a set of subframes. The position of the set of subframes is systematically shifted such that the individual subframes progressively cycle across and wrap around the video image frame area. Video image data bounded by each of the different subframes is independently compressed for successive video frames using motion estimation to reduce data redundancy among the frames. The motion estimation is limited for each subframe of a current video frame to areas of a previous video frame that were bounded by the same subframe in the previous frame. In a preferred embodiment, the set of subframes is shifted once for each successive video frame.

In order to refresh the video image frame area, each subframe includes a refresh region. The video frame image area is progressively refreshed as the subframes cycle thereacross. The refresh techniques disclosed in copending U.S. Pat. No. 07/614,939 referred to above are advantageously used, such that motion estimation displacements from an area that has already been refreshed in a current refresh cycle are not permitted to extend into previous frame data that has not yet been refreshed during the current refresh cycle In an illustrated embodiment, the refresh regions are located at junctions of consecutive subframes, which can be adjacent vertical columns having the refresh region along a vertical edge thereof. In this manner, consecutive subframes are joined at a refresh region.

The subframes can be shifted by a fixed horizontal distance for each successive video frame. The fixed horizontal distance is advantageously equal to the width of the refresh regions. The motion estimation can then be limited, at least in the areas where adjacent subframes adjoin, to a horizontal range that does not exceed the fixed horizontal distance. In this manner, the motion estimation for each subframe of a current video frame is limited to areas of a previous video frame that were bounded by the same subframe in the previous frame. The motion estimation is further controlled to prevent data, contained in regions of the video frames that have not yet been refreshed during a current refresh cycle, from corrupting data contained in regions that have been refreshed during the current refresh cycle.

Apparatus in accordance with the present invention uses multiple encoders to compress video image data using motion compensation. A video frame image area is divided into a plurality of subframes, each corresponding to a different one of the encoders. Means responsive to the dividing means input video image data bounded by each subframe to the corresponding encoder for the subframe. The position of the subframes is systematically shifted as a group within the video image frame area, such that the individual subframes progressively cycle across and wrap around the video image frame area. Means are operatively associated with each encoder for coordinating a motion estimation range thereof with the shifting of the subframes. In this manner, the motion compensation performed by each encoder is limited to video image data available to that encoder. In an illustrated embodiment, the subframes are shifted a fixed distance in a horizontal direction for successive video frames. The coordinating means limit the horizontal motion estimation range for each subframe, at its junction with a preceding subframe, to a distance in a direction toward the preceding subframe that does not exceed the fixed shift distance.

The plurality of encoders can be used to process just the luminance components of the video image data, in which case a separate chrominance encoder is provided for processing all of the chrominance components of a video frame. The compressed video image data output from each of the encoders is combined into a digital output stream for transmission.

Receiver apparatus is provided for processing compressed, motion compensated digital video signals. A received digital data stream is divided into packets, each containing compressed video image data bounded by a different subframe area of a video frame. Means responsive to the received data stream compensate for the shifting of subframe areas in successive video frames, wherein different packets for successive video frames continue to contain data bounded by their respective subframe areas. A plurality of decoders is provided, each corresponding to a different one of the subframe areas, for decompressing video image data contained in the packets. Means operatively associated with the decoders selectively input each packet to the decoder that corresponds to the packet's respective subframe area. Means coupled to an output of each decoder combine the decompressed video image data from the decoders into a video output signal. In an illustrated embodiment, the plurality of decoders each process luminance components of the video image data. A separate chrominance decoder can be provided for decoding chrominance components of the video image data.

BRIEF DESCRIPTION OF THE DRAWINGS

FIG. 8 is a flowchart illustrating a motion estimation process in accordance with the present invention.

DETAILED DESCRIPTION OF THE INVENTION

The present invention provides for the communication of high definition television signals from a transmitter location to a population of receivers. At the transmitter or "encoder" end of the communication link, digital video signals for successive frames of a television picture are broken down into subframes for processing by multiple processors. Each processor includes an encoder that is dedicated to the encoding of signals from a particular subframe. The subframes each include a refresh area and are shifted, e.g., once for each successive video frame, to progressively cycle across and wrap around the video image frame area. Since the subframes each contain a refresh area, the video image frame area is progressively refreshed as the subframes cycle thereacross.

Figure 1:
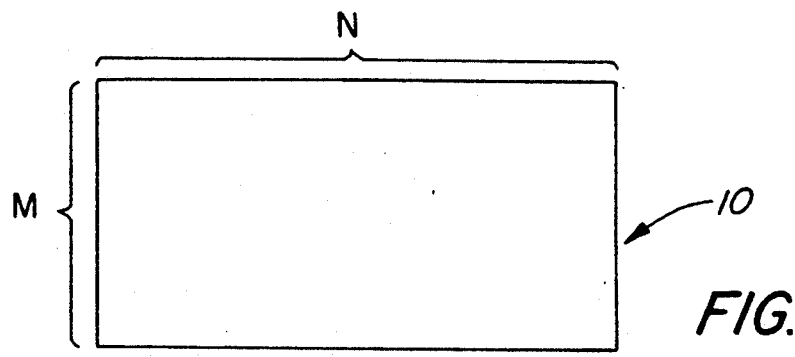
FIG. 1 is a schematic representation of a video image frame area.

A video image frame area generally designated 10 is illustrated in FIG. 1. The total frame area encompasses M horizontal lines each containing N pixels. For example, a single HDTV frame can comprise 960 lines each having 1,408 pixels.

Figure 2:
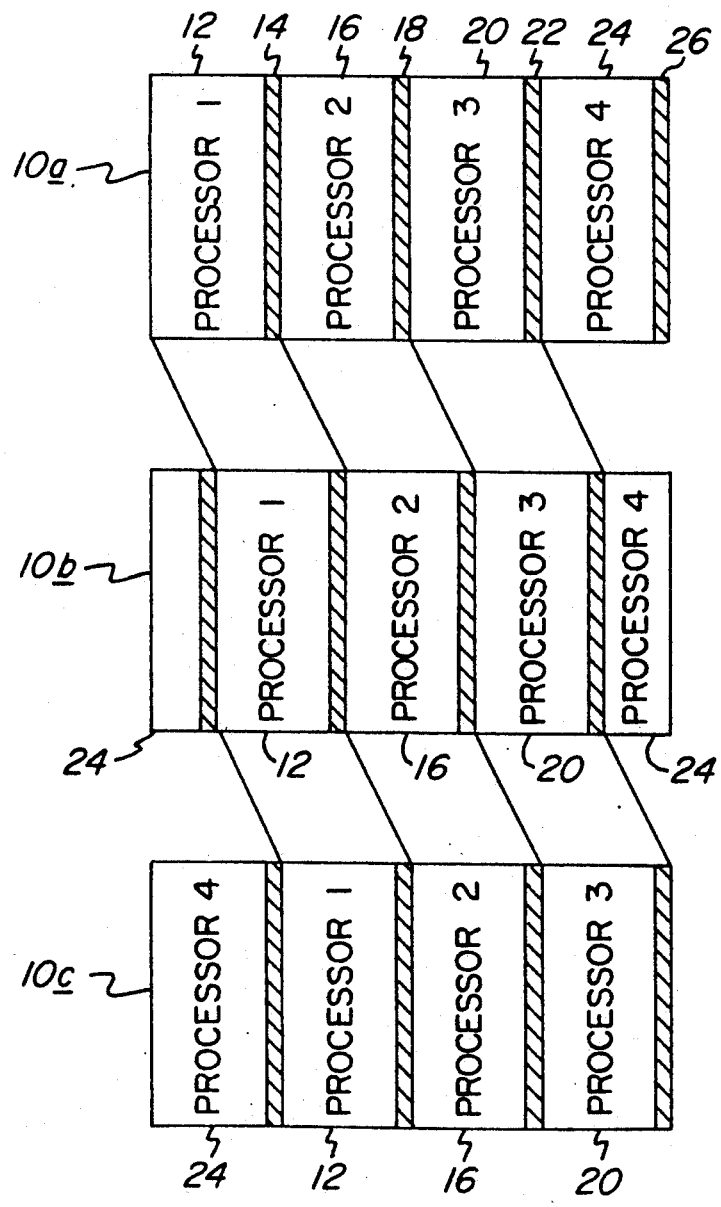
FIG. 2 is a diagram illustrating the shifting of subframes across three different video frames.

In accordance with the present invention, the video image frame area is divided into a plurality of subframes, such as subframes 12, 16, 20, 24 illustrated in FIG. 2. In the embodiment illustrated, each of the subframes has dimensions of 960 lines by 352 pixels per line. It should be appreciated that a different number of subframes could be provided having corresponding dimensions to fill the video image frame area. Also, the subframes do not have to be vertical columns as illustrated, although such a structure is advantageous for reasons that will become apparent Each subframe includes a refresh region, wherein PCM encoding (i.e., without motion compensation) is provided to progressively refresh the entire video image frame area as described in greater detail below. Thus, for example, subframe 12 includes refresh region 14, subframe 16 includes refresh region 18, subframe 20 includes refresh region 22, and subframe 24 includes refresh region 26.

In order to progressively refresh the entire video image frame area, the set of subframes is shifted (for example, to the right) each time a new video frame is received for processing. In the illustrated embodiment, the four subframes 12, 16, 20, 24 are shifted to the right by 32 pixels for each new video frame. The 32 pixel dimension is fixed, and corresponds to the width of one "superblock" used in the data compression process. For simplicity, each of refresh regions 14, 18, 22, 26 is also 32 pixels wide. Therefore, after approximately five frames, the partitioning illustrated at frame 10a of FIG. 2 will be shifted to the locations illustrated in frame 10b. After eleven frames, the partitioning will have shifted to the positions shown in frame 10c. As can be seen by comparing frame 10a to frame 10b, the subframes wrap around to the left side of the video image frame area after shifting past the right edge. By continuing the shifting process, each of the individual subframes will progressively cycle across and wrap around the video image frame area in a repetitive fashion.

A separate processor is assigned to each subframe for compressing the digital data bounded by the subframe in successive video frames. Data redundancy between a current video frame and one or more prior video frames is reduced using motion estimation/compensation techniques. By distributing the processing of a video image frame area among a plurality of processors, HDTV transmission can be accommodated using encoders that are essentially the same as those used for NTSC signal transmission. Since an NTSC signal contains significantly less data than an HDTV signal, the NTSC signal can be processed by a single encoder, while HDTV signal processing can be accomplished using a plurality of such processors. Distributing the processing of HDTV signals among multiple processors also allows a low data rate to be maintained within the individual processors.

Figure 3:
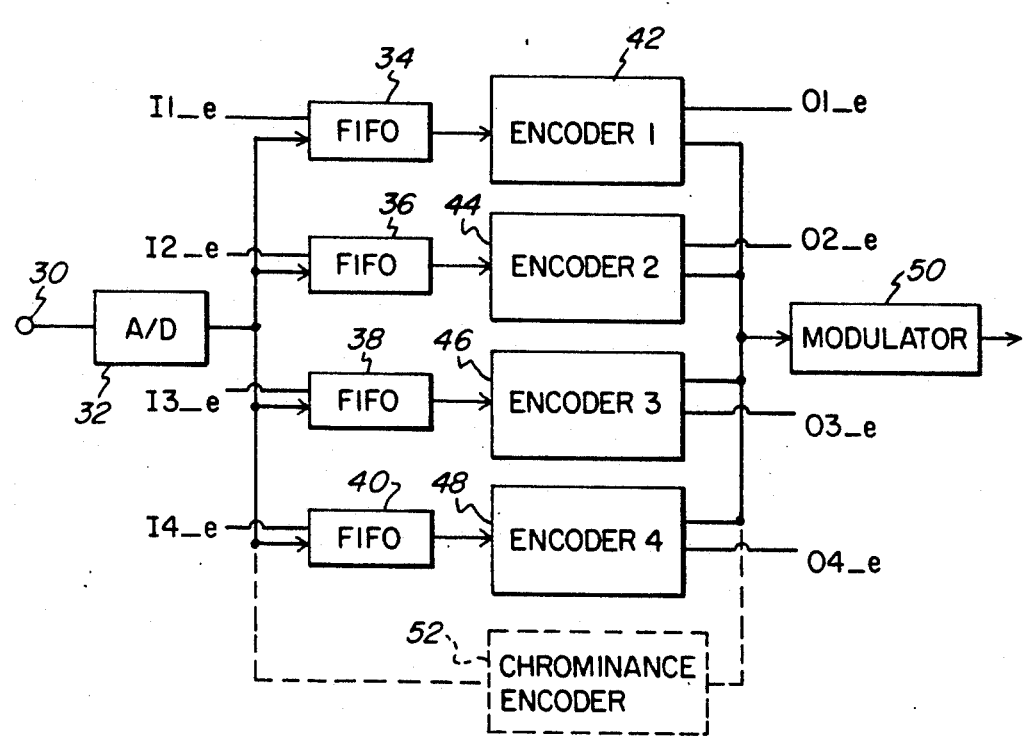
FIG. 3 is a block diagram of encoder apparatus in accordance with the present invention.

FIG. 3 illustrates a multiple processor implementation of an HDTV system in accordance with the present invention. A video signal to be processed is input via terminal 30 to an analog-to-digital converter 32. Each frame of the incoming signal is divided into a plurality of subframes by actuating a plurality of first-in first-out ("FIFO") buffers 34, 36, 38, 40 to receive data at different times. Actuation of the FIFOs is provided by timed control signals 11_e through 14_e described in greater detail below. The FIFOs output the subframe data to a corresponding plurality of encoders 42, 44, 46, 48. Each of the encoders is dedicated to the processing of video image data bounded by a particular subframe. The encoders continue to service the same subframe as it is shifted across the video image frame area.

In order to perform motion estimation within its subframe area, each encoder has its own current frame and previous frame memory. Each encoder is also responsible for updating or refreshing a portion of the image area bounded by its subframe. The processed subframe data from the encoders is combined for modulation by a modulator 50, and transmitted along a transmission path (e.g., satellite television broadcast) to a population of receivers. Output of the encoded subframe data in a proper order from the encoders is controlled by encoder output control signals 01_e through 04_e, discussed in greater detail below.

Encoders 42, 44, 46, 48 can process both luminance and chrominance data. If the chrominance is horizontally subsampled by a factor of four, then the data rate of each component is reduced so that the U and V component data can be clocked directly into the current frame memory of the appropriate encoder, obviating the need for similar FIFO stages for the chrominance components. The same data lines can be shared for both the U and V components by selecting the U component during even fields and the V component during odd fields of each video frame. Only one field of each chrominance component is required for processing. Alternatively, the same data lines can be shared in a progressive scan system by selecting the U component during the even lines and the V component during the odd lines of each video frame.

In an alternate embodiment illustrated by dashed lines, a dedicated chrominance encoder 52 is provided to encode the chrominance components. This implementation is advantageous in the illustrated embodiment since a chrominance frame, consisting of one field of U data and one field of V data, is identical in size to each luminance subframe. Such an embodiment permits the chrominance components to be processed independently of the luminance information.

Figure 4:
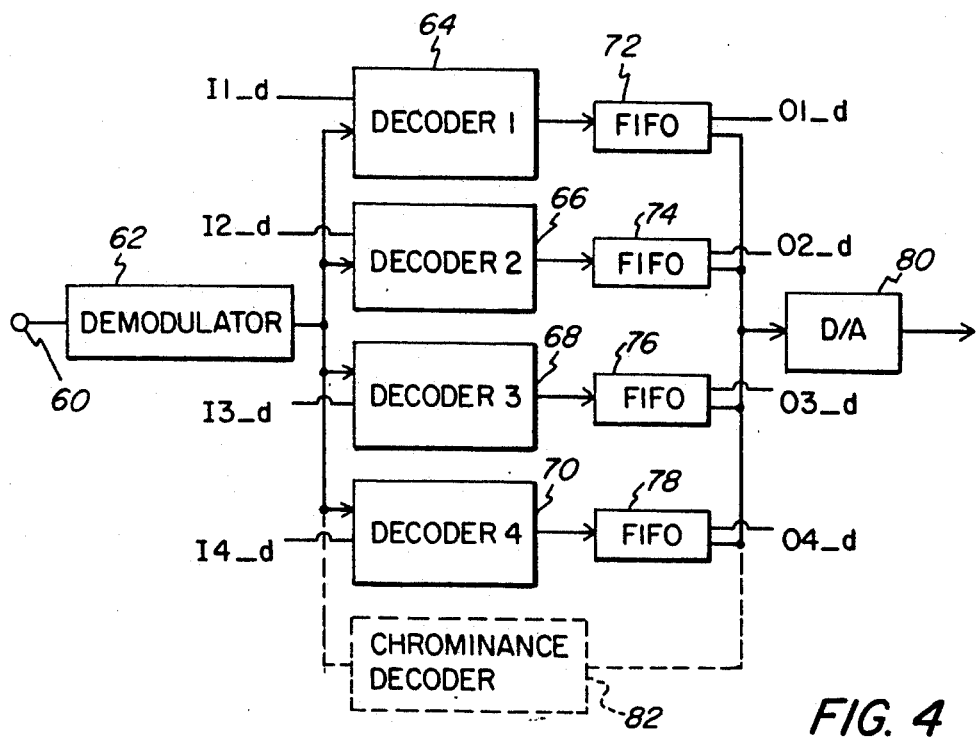
FIG. 4 is a block diagram of decoder apparatus in accordance with the present invention.

FIG. 4 illustrates decoder apparatus in accordance with the present invention. A signal received from the encoder apparatus of FIG. 3 is input at terminal 60 to a demodulator 62. The demodulated signal is then distributed among decoders 64, 66, 68 and 70 in response to decoder input control signals I1_d through I4_d, with each decoder processing video image data bounded by a corresponding subframe. In other words, decoder 64 will process the subframe data encoded by encoder 42. Similarly, decoders 66, 68, 70 will process the video image data bounded by the subframes processed by encoders 44, 46, 48, respectively. The decoded data output from decoders 64, 66, 68, 70 is input to corresponding FIFO buffers 72, 74, 76, 78, respectively. Data is then output from the buffers in accordance with control signals 01_d through 04_d, for input to a digital-to-analog converter 80 that outputs a video output signal for reproduction on a television set or the like. An optional chrominance decoder 82 can be provided to process chrominance components encoded by optional chrominance encoder 52.

Figure 5:
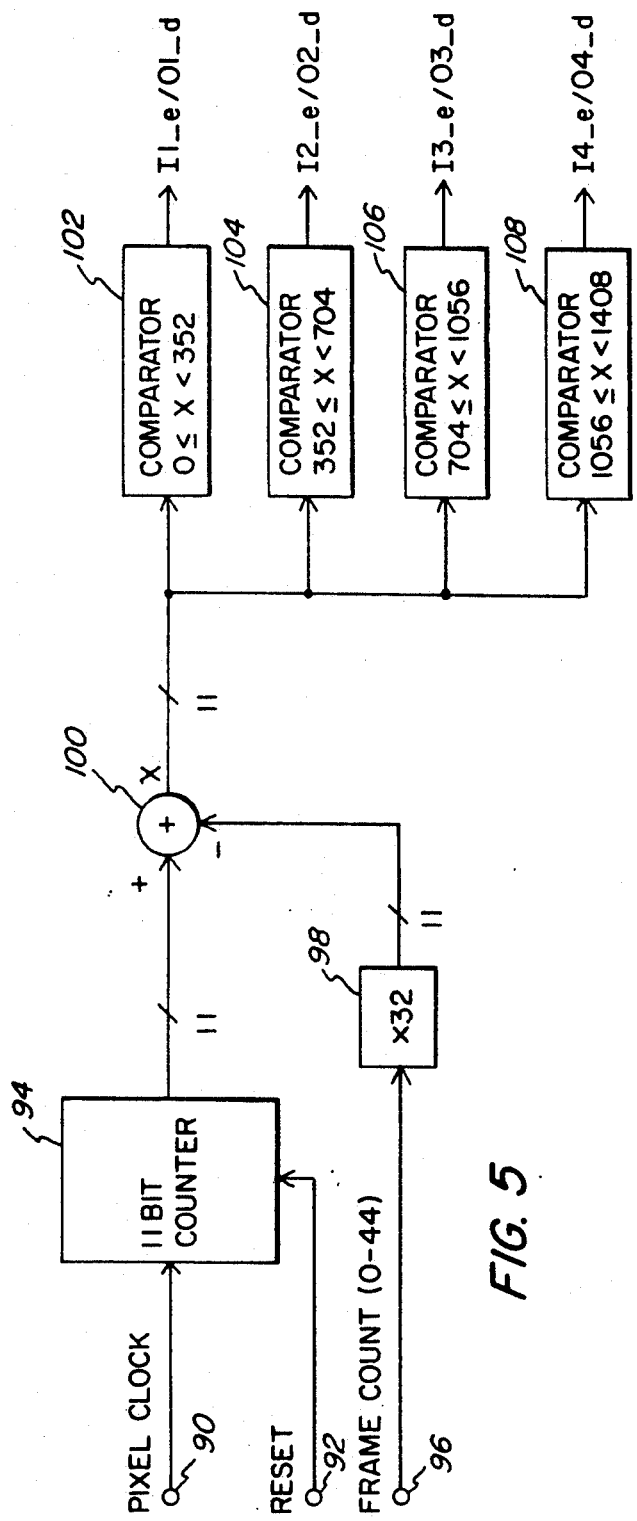
FIG. 5 is a block diagram of a circuit for generating control signals used in the encoder and decoder of FIGS. 3 and 4.
Figure 6:
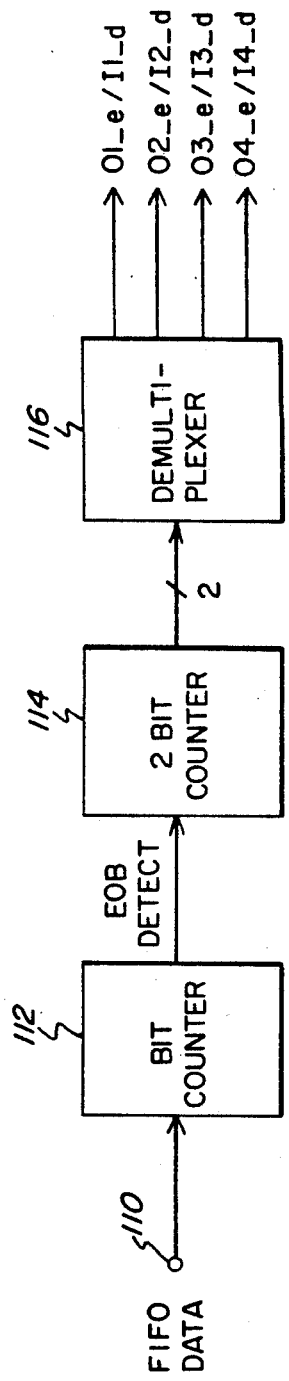
FIG. 6 is a block diagram of a circuit for providing encoder output and decoder input enable signals.

The control signals used to divide the video image frame area into subframes at the encoder and reconstruct the video frames at the decoder are generated by the circuits illustrated in FIGS. 5 and 6. As noted above, the video signals input to the encoder of FIG. 3 are digitized and deposited in one of the four FIFOs 34, 36, 38, 40. In the illustrated embodiment, each FIFO stores data for one of the four processors and can be as small as 352 by 8 bits. Control signals I1_e through I4_e are used to enable the appropriate FIFO and to account for the shifting of the subframes from left to right. These signals can be generated by the circuit of FIG. 5.

As indicated in FIG. 5, a pixel clock signal is input at terminal 90 to an 11 bit counter 94. Although the pixel clock runs continuously, it is only coupled to counter 94 during times when active video data is being processed within the video frame area. Counter 94 is reset to zero at the end of every horizontal line by inputting a reset pulse at terminal 92 derived from the standard horizontal synchronization signal. In an embodiment where the video image frame area contains 1408 pixels for each horizontal line, counter 94 will count from zero to 1408 repetitively. Comparators 102, 104, 106, 108 divide the count into four subframes, each 352 pixels wide. At the beginning of a new frame, comparator 102 outputs a signal to enable FIFO 34 (FIG. 3) to receive data for the first subframe and output the data to encoder 42. This is achieved using a FIFO enable signal I1_e. A similar circuit at the decoder provides a signal 01_d to cause FIFO 72 (FIG. 4) to output the first subframe of data to digital-to-analog converter 80. The second subframe commences after 352 pixels have been processed for the first subframe, at which time comparator 104 provides an I2_e signal for FIFO 36 (encoder circuitry) or 02_d signal for FIFO 74 (decoder circuitry). The same process continues with comparator 106 providing control signals for the third subframe and comparator 108 providing control signals for the fourth subframe.

After all four subframes have been processed for the first video frame, the next video frame will arrive and the position of the set of subframes with respect to the video image frame area is shifted by 32 pixels. This is accomplished by a conventional shift register or multiplication circuit 98 that multiplies a frame count input at terminal 96 by a factor of thirty-two. The product is subtracted from the count output by counter 94 in a subtraction circuit 100. The frame count input at 96 is reset after all of the video data in a given frame has been processed. In the illustrated embodiment, where there are a total of 1408 pixels in each horizontal line, and the data is processed in "superblocks" that are each 32 pixels wide by 16 lines high, a total of 44 (1408 divided by 32) frames must be processed to cover a complete cycle wherein the subframes are shifted entirely across the video image frame area and back to their initial positions. By multiplying the frame count, which cycles from zero to 43, by 32, and subtracting the product from the pixel clock bit counter output, the subframes are shifted by 32 bits for each successive frame on a continuous basis.

FIG. 6 illustrates the generation of encoder output control signals and decoder input control signals. In the illustrated embodiment, a "macroblock" is defined as a packet of eight superblocks that are packaged for transmission. At the encoder, the data bits output from FIFOs 34, 36, 38, 40 are input at terminal 110 to a bit counter 112 that counts the data bits or alternatively searches for an end of clock sequence. Bit counter 112 outputs an end-of-block ("EOB") detect signal at the conclusion of the data stream for the current subframe, for input to a two-bit counter 114. Counter 114 increments a zero to four count each time an EOB detect signal is received, for use by a demultiplexer 116 in consecutively generating encoder output control signals 01_e, 02_e, 03_e, 04_e for each of the four encoders. At the decoder, an identical circuit counts the data input to FIFOs 72, 74, 76, 78 to provide decoder input enable signals I1_d, I2_d, I3_d, and I4_d.

In order to maintain complete independence among the separate subframe processors, it is necessary to ensure that the motion estimation process carried out by each encoder never requires a memory access that exceeds the bounds of the previous frame memory associated with the particular encoder. Otherwise, the design of the system would be substantially complicated by requiring a certain amount of memory overlap in each processor or alternatively, a shared memory system with multiple random access capability. One method of ensuring that the bounds of the previous frame memory are not exceeded would be to impose special restrictions on the motion estimator. However, such a solution could impair coding efficiency and further complicate the design of the encoders.

In the system of the present invention, maintaining independence among the different processors is facilitated, since each subframe is shifted (e.g., to the right) after each video frame. This is confirmed by referring to FIG. 2. For example, consider the left-most column of superblocks associated with one of the four processors illustrated in connection with video image frame area 10a. A problem might be expected when movement within the video image is from left to right, since this would suggest a match in the portion of previous frame memory that exists only in the processor to the left. However, by shifting the current frame to the right relative to the previous frame in accordance with the present invention, a motion estimator displacement to the left of up to 32 pixels is permitted. As long as this exceeds the horizontal range of the motion estimator, it will never be necessary to access previous frame memory that is not associated with the particular subframe processor.

Next consider the second to the last column of superblocks from the right edge of one of the four subframes. Since the subframes in the current video frame are shifted 32 pixels to the right of the subframes in the previous video frame, there is insufficient data in the previous frame memory if movement of a video image is from right to left. However, in the illustrated embodiment, the right-most column of superblocks in each subframe is the current refresh region. As noted above, a refreshing process can be implemented that prohibits displacements from an area that has already been refreshed in a current refresh cycle (e.g., the second to last column of superblocks from the right edge of each subframe) that would extend into previous frame data that has not yet been refreshed during the current refresh cycle. Otherwise, a column of superblocks refreshed in a previous subframe could be quickly corrupted by unrefreshed previous frame data. Since the refresh process already prohibits displacements into unrefreshed areas, video image movement from right to left is not estimated in the second to last column of superblocks from the right edge of any of the subframes.

Finally, access by a particular processor to unavailable previous frame memory is not required in the last column of superblocks at the right edge of each subframe, because this column is always the one that is due to be refreshed. Since refreshing is performed by using PCM coding, access to previous frame memory is not required. Therefore, independence of each of the parallel subframe processors is assured under all circumstances.

Figure 7:
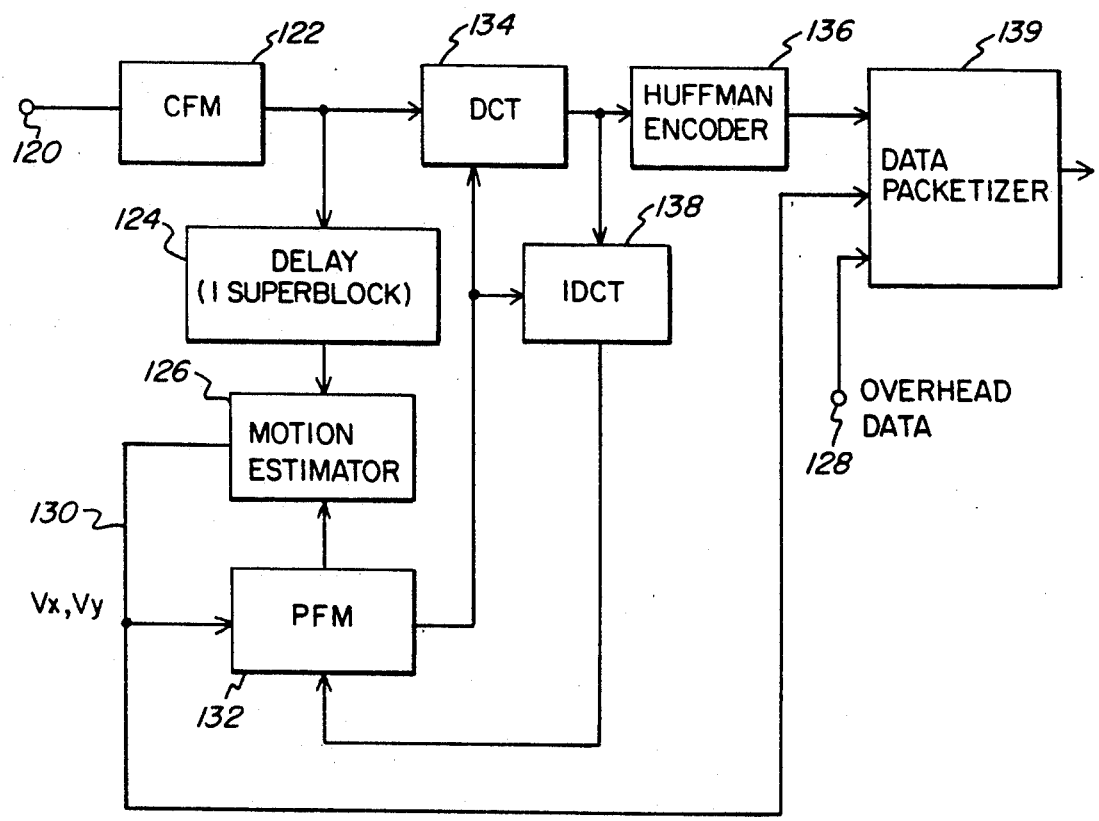
FIG. 7 is a block diagram of data compression and motion estimation circuitry that can be used in accordance with the present invention.

FIG. 7 illustrates the motion estimation process performed by each of the encoders. The digital video data is input at terminal 120 to a current frame memory 122. A delay of one superblock (32 pixels) is inserted by delay circuit 124, and the delayed current frame data is input to a motion estimator 126. Motion estimator 126 is a conventional device, that outputs horizontal and vertical motion vectors $V_x$, $V_y$ on line 130 for use in performing motion compensation with respect to the video data in previous frame memory 132. The motion vectors $V_x$, $V_y$ are also input to a conventional data packetizer 139, where they are packetized with the encoded video data output from a Huffman encoder 136 and various overhead data (e.g., synch, quantization level, frame number, PCM/DPCM coding identifier) input at terminal 128. In this manner, the motion vectors will be transmitted to the decoder for use in addressing the decoder's previous frame memory. Discrete cosine transform circuit 134, inverse discrete cosine transform circuit 138, and Huffman encoder 136 are all conventional signal compression components well known in the art.

FIG. 8 is a flowchart illustrating the control of PCM and DPCM coding in the encoders of the present invention. The routine begins at block 140, and at block 142 subframe data is received from a video frame n. As an example, encoder 42 of FIG. 3 will receive subframe 12 from the first video frame when system operation commences. Processing of the video data in the illustrated embodiment takes place on a block-by-block basis. At box 144, the encoder receives data from a first block i.

At box 146, a determination is made as to whether the current data block being processed is in a refresh region (e.g., refresh region 14 of subframe 12). If so, nonmotion compensated PCM data is output from the encoder for modulation and transmission as indicated at box 156. The PCM data serves to refresh that portion of the video image frame area. If the current data block is not in a refresh region, a determination is made at box 148 as to whether the data block is adjacent the refresh region of its subframe. If it is, all motion vectors to unrefreshed regions are deleted at box 158, to prevent data refreshed in a previous frame from being corrupted by previous frame data that has not yet been refreshed in a current refresh cycle.

At box 150, a determination is made as to whether the current data block being processed is adjacent another subframe. This would be the case, for example, for the first column of data on the left edge of any subframe of the illustrated embodiment. If the current data block is adjacent another subframe, then the horizontal range of the motion estimator is limited to no more than the subframe shift distance so that the encoder will not attempt to access previous frame data that it does not have available to it (box 160).

After any limitations required by the position of the current block as determined at boxes 146, 148 and 150 have been imposed, motion estimation is performed over the permitted range as indicated at box 152. Then, at box 154 the DPCM data resulting from the motion estimation process is output for modulation and transmission.

After processing each data block, the encoder determines at box 162 whether it was the last unprocessed data block bounded by the encoder's corresponding subframe in the current video frame. If not, there are additional blocks to be processed for the subframe, and at box 168 the block counter i is incremented. Processing of the next data block then commences at box 144. In the event the encoder's last subframe block has just been processed for the current video frame, a determination is made at box 164 as to whether the current refresh cycle has been completed. A refresh cycle commences when the subframes are aligned as illustrated in video image frame area 10a of FIG. 2. In the illustrated embodiment, the refresh cycle is completed 11 frames later when the subframes are aligned as shown in video frame image area 10c of FIG. 2. Thus, for each complete cycling of the subframes across the entire video image frame area, a total of four refresh cycles will be completed.

If box 164 determines that a current refresh cycle has been completed, a refresh cycle counter is reset at box 166. This enables the motion estimator to keep track of which regions have been refreshed during a current refresh cycle, so that data contained in regions that have not been refreshed can be avoided in the motion estimation process, thereby preventing the corruption of data contained in regions that have been refreshed during the current refresh cycle.

After the last subframe block of a current video frame has been processed, and the refresh counter reset if necessary, the subframe counter n is incremented at box 170, the subframes are shifted (e.g., by 32 bits in the horizontal direction) at box 172, and the routine continues as long as the system is in operation.

It should now be appreciated that the present invention provides a method and apparatus for encoding digital video signals for transmission in a compressed, motion compensated form. Refreshing of a video image frame area and motion estimation of video images is provided independently for each of a plurality of subframes that together fill the video image frame area. The subframes are systematically shifted to provide progressive refreshing of the entire video image frame area and enable motion estimation within each subframe processor without a need for the processor to access previous frame image data it does not possess.

Although the invention has been described in connection with an illustrated embodiment thereof, those skilled in the art will appreciate that numerous adaptations and modifications may be made thereto without departing from the spirit and scope of the invention, as set forth in the following claims.

WHAT IS CLAIMED IS:

1. A method for encoding digital video signals for transmission in a compressed, motion compensated form comprising the steps of:
    dividing a video image frame area into a set of subframes;
    systematically shifting the position of said set of subframes such that the individual subframes progressively cycle across and wrap around said video image frame area;
    independently compressing video image data bounded by each of said different subframes in successive video frames using motion estimation to reduce data redundancy among the frames; and
    limiting the motion estimation for each subframe of a current video frame to areas of a previous video frame that were bounded by the same subframe in the previous frame.

2. A method in accordance with claim 1 wherein said shifting step shifts the set of subframes once for each successive video frame.

3. A method in accordance with claim 2 wherein each subframe includes a refresh region.

4. A method in accordance with claim 3 wherein said refresh regions are located at junctions of consecutive subframes.

5. A method in accordance with claim 1 wherein said subframes are adjacent vertical columns.

6. A method in accordance with claim 5 wherein each subframe includes a refresh region along a vertical edge thereof, wherein consecutive subframes are joined at a refresh region.

7. A method in accordance with claim 6 wherein said shifting step shifts the set of subframes by a fixed horizontal distance for each successive video frame.

8. A method in accordance with claim 7 wherein said refresh regions have equal widths and said fixed horizontal distance is equal to the width of said refresh regions.

9. A method in accordance with claim 8 wherein said motion estimation is limited to a horizontal range that does not exceed said fixed horizontal distance.

10. A method in accordance with claim 9 comprising the further step of:
    controlling said motion estimation to protect data contained in regions of said video frames that have been refreshed during a current refresh cycle from corrupted data contained in regions that have not been refreshed during the current refresh cycle.

11. A method in accordance with claim 1 comprising the further steps of:
    refreshing a portion of the video image data bounded by each subframe, wherein said video image frame area is progressively refreshed as the subframes cycle thereacross; and
    controlling said motion estimation to protect data contained in regions of said video frames that have been refreshed during a current refresh cycle from corrupted data contained in regions that have not been refreshed during the current refresh cycle.

12. Apparatus for processing digital video signals for transmission in a compressed, motion compensated form comprising:
    a plurality of encoders for compressing video image data using motion compensation;
    means for dividing video frame data occupying a video frame image area into a plurality of subframes, each subframe corresponding to a different one of said encoders;
    means responsive to said dividing means for inputting video image data bounded by each subframe to the corresponding encoder for the subframe;
    means operatively associated with said dividing means for systematically shifting the position of said subframes as a group within said video image frame area, such that the individual subframes progressively cycle across and wrap around said video image frame area; and
    means operatively associated with each encoder for coordinating a motion estimation range thereof with the shifting of said subframes to limit the motion compensation performed by each encoder to video image data available to that encoder.

13. Apparatus in accordance with claim 12 further comprising:
    means associated with each encoder for refreshing a portion of the video image data bounded by the encoder's corresponding subframe, wherein said video frame image area is progressively refreshed as the subframes cycle thereacross.

14. Apparatus in accordance with claim 13 wherein the portion of data refreshed by each encoder is located at a junction of its corresponding subframe with an adjacent subframe.

15. Apparatus in accordance with claim 14 wherein said video image data comprises data from successive video frames, and said shifting means shift the subframes by a fixed distance for each successive video frame.

16. Apparatus in accordance with claim 15 wherein said subframes are adjacent vertical columns.

17. Apparatus in accordance with claim 16 wherein the refreshed portion of data for each subframe is a vertical column within the subframe having a width equal to said fixed distance.

18. Apparatus in accordance with claim 17 wherein said coordinating means limit the horizontal motion estimation range for each subframe, at its junction with a preceding subframe, to a distance in a direction toward the preceding subframe that does not exceed said fixed distance.

19. Apparatus in accordance with claim 18 further comprising:
  means operatively associated with said encoders for controlling the motion compensation to protect data contained in regions of said video frames that have been refreshed during a current refresh cycle from corrupted data contained in regions that have not been refreshed during the current refresh cycle.

20. Apparatus in accordance with claim 13 further comprising:
  means operatively associated with said encoders for controlling the motion compensation to protect data contained in regions of said video frame that have been refreshed during a current refresh cycle from corrupted data contained in regions that have not been refreshed during the current refresh cycle.

21. Apparatus in accordance with claim 12 wherein said video image data comprises data from successive video frames, and said shifting means shift the subframes by a fixed distance for each successive video frame.

22. Apparatus in accordance with claim 12 wherein:
  said plurality of encoders process luminance components of said video image data;
  said apparatus further comprising at least one chrominance encoder for separately processing the chrominance components of a video frame.

23. Apparatus in accordance with claim 12 further comprising means for combining compressed video image data output from each of said encoders into a digital output stream for transmission.

24. A receiver for processing a digital output stream transmitted from the apparatus of claim 23 comprising:
  means for dividing a received digital output stream into packets, each packet containing the compressed video image data provided by a different one of said encoders;
  a plurality of decoders, each corresponding to a different one of said encoders, for decompressing video image data contained in said packets;
  means operatively associated with said decoders for selectively inputting each packet to the decoder that corresponds to the encoder which provided the video image data contained in the packet; and
  means coupled to an output of each decoder for combining the decompressed video image data from the decoders into a video output signal.

25. Apparatus in accordance with claim 24 wherein:
  said plurality of encoders and decoders each process luminance components of said video image data;
  said apparatus further comprising:
  at least one chrominance encoder for separately encoding the chrominance components of said video image data; and
  at least one chrominance decoder for separately decoding chrominance components provided by said chrominance encoder.

26. Receiver apparatus for processing compressed, motion compensated digital video signals comprising:
  means for dividing a received digital data stream into packets, each packet containing compressed video image data bounded by a different subframe area of a video frame;
  means responsive to said received data stream for controlling said dividing means to compensate for the shifting of said subframe areas in successive video frames, wherein different packets for successive video frames continue to contain data bounded by a respective subframe area;
  a plurality of decoders, each corresponding to a different one of said subframe areas, for decompressing video image data contained in said packets;
  means operatively associated with said decoders for selectively inputting each packet to the decoder that corresponds to the packet's respective subframe area; and
  means coupled to an output of each decoder for combining the decompressed video image data from the decoders into a video output signal.

27. Receiver apparatus in accordance with claim 26 wherein:
  said plurality of decoders each process luminance components of said video image data;
  said apparatus further comprising at least one chrominance decoder for separately decoding chrominance components of said video image data.

* * * * *